Feb. 23, 1965 J. A. FITZMAURICE ETAL 3,171,097

CHARACTER RECOGNITION DEVICES

Filed April 27, 1961 3 Sheets-Sheet 1

INVENTORS

John A. Fitzmaurice &

BY Edward N. Sabbagh

Morse & Altman

ATTORNEYS

Feb. 23, 1965 J. A. FITZMAURICE ETAL 3,171,097

CHARACTER RECOGNITION DEVICES

Filed April 27, 1961 3 Sheets-Sheet 2

INVENTORS
John A. Fitzmaurice &
BY Edward N. Sabbagh
Morse & Altman
ATTORNEYS

INVENTORS
John A. Fitzmaurice
BY Edward N. Sabbagh
Morse & Altman
ATTORNEYS

United States Patent Office 3,171,097
Patented Feb. 23, 1965

3,171,097
CHARACTER RECOGNITION DEVICES

John A. Fitzmaurice, Arlington, and Edward N. Sabbagh, Andover, Mass., assignors to Baird-Atomic, Inc., Cambridge, Mass., a corporation of Massachusetts Filed Apr. 27, 1961, Ser. No. 106,038
6 Claims. (Cl. 340—146.3)

The present invention relates to character recognition devices for automatically recognizing intelligence symbols such as alphanumeric characters. The word "recognize" is used to signify the transformation of ordinary spacial representations, i.e. letter, numerals, words, etc., into corresponding signals that can be utilized by machines.

The object of the present invention is to provide a novel electro-optical device for automatically identifying an unknown representation or character for translation to a usable indication by simultaneously comparing a plurality of reference representations or filters therewith in order to produce a plurality of signals for identifying logically the unknown representation. By virtue of the foregoing, it is possible to read a relatively large number of different unknown characters with a relatively small number of different reference filters. The design is such that greater than the minimum number of filters, i.e. redundancy, serves to eliminate error to a high degree and such that the small number of filters required for accurate operation contributes to efficient utilization of available light from the unknown character being identified.

In one system of the foregoing type, it is contemplated that certain parts of letters (e.g., vertical and horizontal straight lines, segments, arcs, etc.) serve for comparison with the unknown character. Here only those reference filters having parts corresponding to parts of the unknown character respond to produce a particular indication.

In a prefered system of the foregoing type, it is contemplated that each filter present a two-dimensional array of transmitting and opaque cells in the form of a grid. Here each character is represented as a printed shape defined in terms of the cells of a corresponding grid. Each character in effect is either transparent or opaque in any particular cell. When an unknown character is superposed by the optical system on a filter, the filter will transmit light only through cells which are transparent in both the character and the filter. Each filter is assigned a threshold transmittanse. The filter is considered to be in the transmitting or "1" state if the filter output is greater than $t$, which represents a given threshold transmittance, and in the non-transmitting or "*o*" state, if the output is less than or equal to $t$. Since each filter has a binary output, a minimum of $\log_2 n$ filters is required to distinguish $n$ characters. However, the minimum number of filters leads to unreliability in certain cases where the thresholds are marginal. As indicated above, reliability is increased by introducing redundancy in the form of additional filters. In general, then, the number of filters preferably is somewhat less in number than the number of different unknown characters to be recognized and somewhat greater in number than $\log_2 n$, where $n$ is the number of different unknown characters.

Other objects of the present invention will in part be obvious and will in part appear hereinafter.

The invention accordingly comprises the device possessing the construction, combination of elements and arrangement of parts, which are exemplified in the following detailed disclosure and the scope of which will be indicated in the appended claims.

For a fuller understanding of the nature and objects of the present invention, reference should be had to the following detailed description, taken in connection with the accompanying drawings, wherein.

Figure 1:
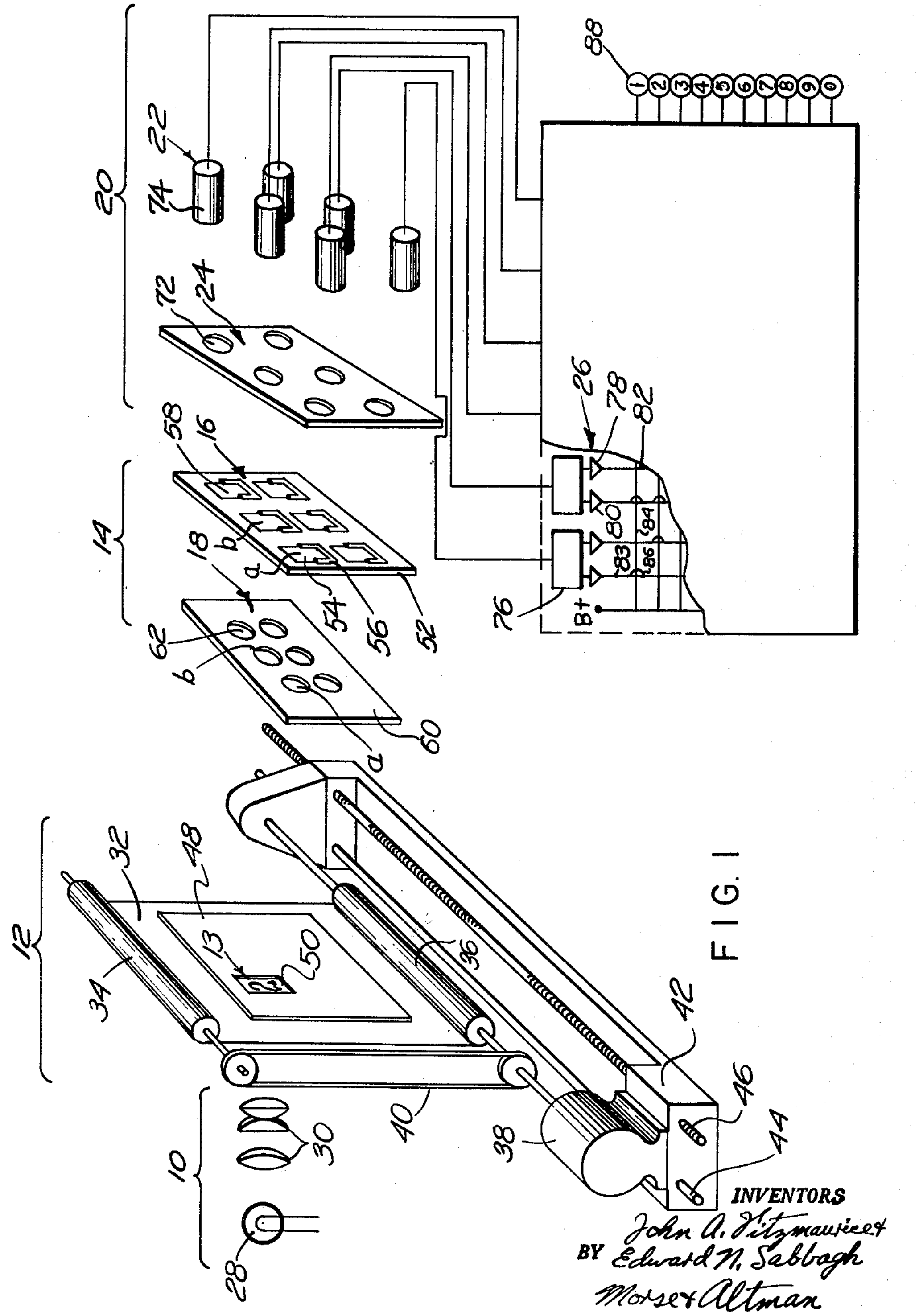
FIG. 1 is a schematic view, partly mechanical and partly electrical, of a device illustrating the principles of the present invention.

Generally, the system illustrated by way of example in FIG. 1 comprises: an illuminating component 10; a positioning component 12 for moving unknown characters 13 along $x$ and $y$ axes into predetermined location; a matching component 14 including an array 16 of filters of a type to be described in detail below and an array 18 of lenses for registering one of unknown characters 13 at one time on each of the filters of array 16; a detecting component 20 including an array 22 of detectors for receiving light via an array 24 of lenses from the filters of array 16 in order to provide a plurality of signals; and an analyzing component 26 in the form of an AND-matrix which provides an indication of the unknown character in response to the signals from the detecting component.

As shown, illuminating component 10 includes an incandescent lamp 28 for generating a suitable light and a condensing lens arrangement 30 for directing this light in equal flux cross-section toward unknown character 13. In the form shown, the unknown characters are arabic numerals 1 through 0 arranged in rows extending across an elongated transparent photographic film 32. Photographic film 32 is advanced from a supply spool 34 to a takeup spool 36. The operation of supply spool 34 and takeup spool 36 is controlled by a drive 38 which determines the rotational position of the spools by a wheel and pulley system 40. The transverse position of photographic film 32 is controlled by a drive 42 which determines the transverse position of the carriage on a slide rail 44 and a rack 46. A shield 48 having an aperture 50 permits only one predeterminedly located character 13 to be presented for recognition at any one time.

Figure 2:
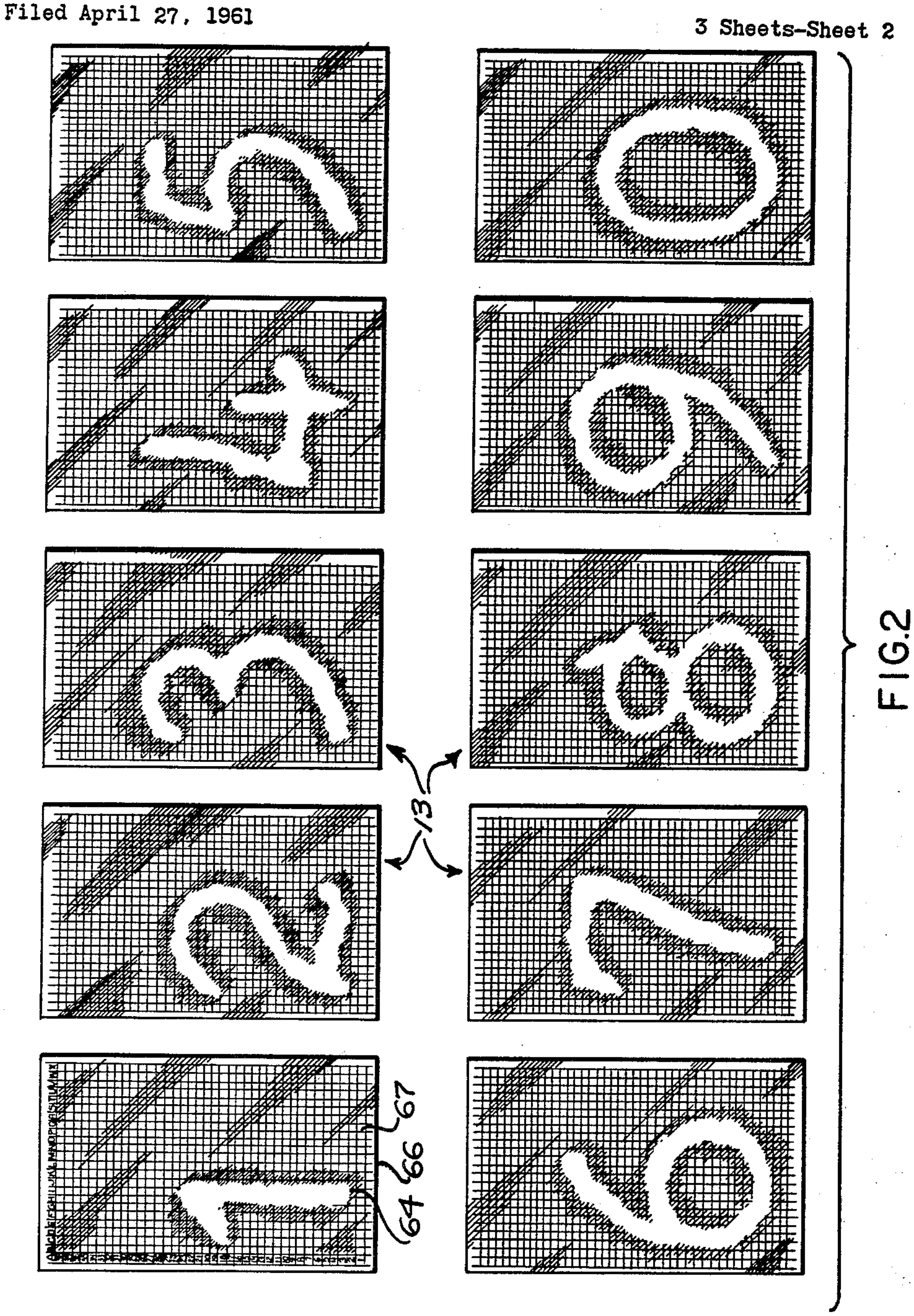
FIG. 2 is a plan view of a series of unknown characters to be recognized by the device of FIG. 1.
Figure 3:
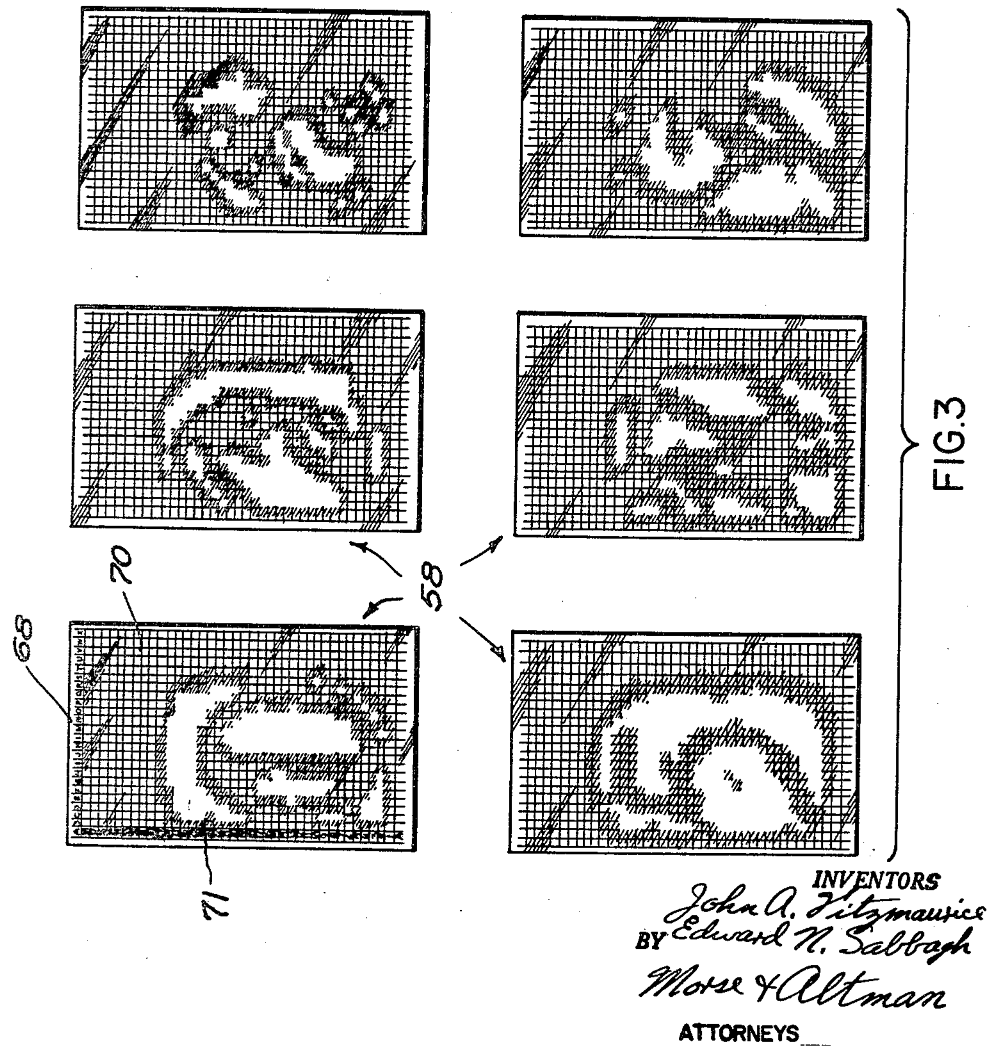
FIG. 3 is a plan view of a series of filters useful in recognizing the unknown characters of FIG. 2.

Matching component 14, as indicated above, includes an array 16 of filters and an array 18 of objective lenses for imaging unknown character 13 thereupon. Array 16 includes a mount 52 having six apertures 54 associated with six holders 56. Holders 56 are adapted to retain six removable filters 58 in registration with apertures 54. Array 18 includes a mount 60 for six lenses 62. Each individual lens 62 images unknown character 13 on one individual filter 58, the arrangement being such that lens "*a*" establishes an optical path between unknown character 13 and filter "*a*," lens "*b*" establishes an optical path between unknown character 13 and filter "*b*," etc. It will be apparent that unknown character 13 and one each of filters 58 are the conjugate foci of one each of lenses 62. As will be described in detail below, FIGS. 2 and 3 illustrate a group of unknown characters and a group of reference filters, respectively. Each character is represented as a transparent shape 64 superimposed on a black background 66. In order to represent the unknown character in digital form, it and its background in effect are divided into a two dimensional grid of black and white square cells 67. Likewise, each of filters 58 is divided into a two dimensional grid of square cells 68. Various cells 70 are rendered opaque and others 71 transparent on the basis of empirical or predicted design, one method of which will be described in detail below.

When one of character grids 66 is superimposed upon one of filter grids 68, the composite of the two will transmit light only through registered cells which are transparent in both the character grid and the filter grid. It is apparent, for example, that any filter may be selected to transmit in a region where only a single selected character is transparent. Such a filter will be able to distinguish such a character on that basis. It is apparent also that several filters may be used similarly together to distinguish among several characters. The filters may involve either graduations of gray or may involve only black and white. The filter designs described below involve cells which are either black or white.

Analyzing component 20 includes an array 24 of lenses 72 and an array 22 of detectors 74. Each individual lens 72 directs all of the light flux from one individual filter 58 to one individual detector 74. Each filter 58 may be considered to have a threshold transmittance which its detector indicates to be a "1" if its transmitted light flux is greater than an arbitrarily chosen level. The output of the detectors 74 of array 22 are applied to six flip-flops 76, the condition of which is determined by whether or not the output of the detector is "1" or "0." Flip-flops 76 operate through magnetic amplifiers 78 and 80 to a diode matrix 82. In conventional fashion, each of the input lines from the driving amplifiers represent the "0" and "1" states and are selectively connected to a decade output 88 through diodes 86 (which are indicated by the small D-shaped symbols). The input lines, two per filter, are designated 83 and the output lines 84. In conventional fashion, when all of the input lines 83 associated with a given output indicator 88 are energized by flip-flops 76, the given indicator is energized.

Two examples of methods for designing the filters of FIG. 3 to recognize the characters of FIG. 2 now will be described.

EXAMPLE I

(*1*) *Introduction*

Each filter consists of a rectangular array of cells, each of which is either "transparent" or "opaque." The characters are represented in the same fashion.

When a character is superimposed on a filter, the filter will transmit light only through cells which are transparent both in the character and the filter. Thus the output of a filter for a particular character is the sum of the corresponding cells of the filter and the character which are both transparent. Then if any filter has a threshold transmittance *t*, the filter is considered to be in the transmitting or "1" state, if the filter output is greater than *t* and in the non-transmitting or "0" state if the filter output is less than or equal to *t*.

For any filter, the characters may be divided into three groups:

(*a*) Those which always cause the filter to respond in the transmitting mode (output$>>t$).

(*b*) Those which always cause the filter to respond in the non-transmitting mode (output$<<t$).

(*c*) Those whose outputs are too close to *t* for the filter to have a reliable response.

Since each filter has a binary output, a minimum of $\log_2 n$ filters is required to distinguish among *n* characters. However, a minimum number of filters lead to unreliability in certain cases where the thresholds are marginal. Reliability can be increased by introducing additional filters; then a particular character can be specified by the binary outputs of only these filters whose response to that character is reliable.

(*2*) *Filter design*

Each filter has associated with it two groups of characters:

(*a*) Those characters which throw it into the transmitting mode (the A-group), and (*b*) Those characters which throw it into the non-transmitting mode (the B-group).

If there are *n* characters altogether, the filters must distinguish between each of the $n(n-1)/2$ pairs of characters. If there are *k* characters in the A-group and *m* characters in the B-group, for a particular filter, this filter can distinguish between *k* times *m* different pairs of characters.

When designing the filters, it is necessary that each pair be distinguished by at least one filter. A pair-list must, therefore, be available. Each pair then can be checked off as soon as it is established that a filter can distinguish between the two characters constituting the pair. When all pairs in the pair-list have been checked off, the design is complete.

When the pair-list is formed, each pair is ordered so that the character with the larger area is designated as an A-group character, and the character with the smaller area is designated as a B-group character.

All cells that are included in any character in the B-group of a given filter are opaque ("0") in that filter. Cells included in one or more characters of the A-group but in no character of the B-group are transparent. Cells not included in any charcter of that filter are regarded as unassigned.

When entering a pair in a filter, there are thre possibilities;

(*a*) The A-group character is already in the A-group.

(*b*) The B-group charcter is already in the B-group (*c*) Neither of the two characters is present.

Let there be *k* members in the A-group and *m* members in the B-group. The number of additional pairs distinguished by the filter for each of the three possibilities given above are *k*, *m* and $k+m+1$, respectively. Not all of the additionally distinguished pairs are necessarily new pairs, since some of them may have been previously distinguished by other filters.

This design procedure introduces successive pairs from the pair-list into one of the sets of partially designed filters. If no existing filter can be modified to distinguish between the characters of the new pair without destroying its ability to distinguish reliably between its list of characters, a new filter is created. Conceptually, the most difficult part of this design procedure is to establish criteria for deciding when a pair should be assigned to a given filter. This is accomplished by computing a "score" to represent the "goodness of fit" of a given pair with respect to a partially designed filter. When making a decision with regard to a given pair, the scores for each filter with respect to that pair are computed. If the resulting maximum score is above a preset minimum, the pair is entered into the filter for which the score is a maximum. If the score is below the minimum, a new filter is created. Thus the value chosen for the minimum plays an important role in determining the number of filters required. The same is true also of other parameters which are used in the scoring computation.

(3) *Pair entries*

Consider a generic pair A, B where A is being entered into the A-group and B into the B-group.

Figure 4:
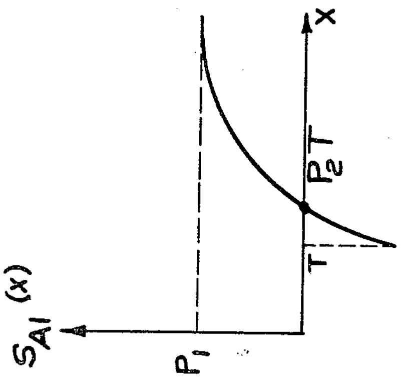
FIG. 4 is a diagram illustrating certain features of the design of the filters of FIG. 3.

(*a*) A-SCORE ($S_A$)—SEE FIG. 4

The simplest case occurs when B is already present in the B-group. In this case, the opaque area in the filter is unchanged and the transmittances of all characters already in the A-group are unchanged. It is necessary only to compute the score $S_A$ of the A-character being entered into the A-group. This score is the sum of the four component scores $S_{A1}$, $S_{A2}$, $S_{A3}$ and $S_{A4}$. $S_{A1}$, which is the component of the score due to the transmittance *x* of the A-character, is given by the equation:

$$S_{A1}=P_1\frac{x-P_2T}{x-T}$$

where $P_1$ and $P_2$ are parameters of the curve shown in FIG. 4, and T is a tolerance level. ($P_1$ and $P_2$ are positive parameters greater than one; see subsection (*e*) below.) $S_{A2}=-P_3Y$. The score is set to $-\infty$ if *x* is less than or equal to T. T will reach an asymptotic value equal to two times $t$ (see section 1 above). Other things being equal, a bonus is given for A-characters which do not encroach upon unassigned cells, since the presence of unassigned cells permits some flexibility in entering future character pairs. $S_{A2}$ is a negative contribution whose magnitude is proportional to the number to the number of cells $y$ in the intersection of the set of unassigned cells U of that filter with A, and has the form:

$$S_{A2}=-P_{3y}$$

where $P_3$ is a parameter less than one. (The intersection of A and U may be called A "and" U, where "and" is the function which assigns a "1" if, and only if, the corresponding cell of the A-character is a "1." Other things being equal, a high A-score is more valuable in a filter with a larger number of cells in the B-group, since this implies a better "fit." $S_{A3}$ is proportional to the number of opaque cells $M_B$ in the union of all B-group characters, and is expressed by:

$$S_{A3}=P_4M_B$$

where $P_4$ is a positive parameter much less than 1. Other things being equal, it is advantageous to enter a pair into a filter with many unassigned cells, since for equal scores, this implies a better "fit." $S_{A4}$ is given by the expression:

$$S_{A4}=P_5M_U$$

where $M_U$ is the total number of unassigned cells and $P_5$ is a positive parameter of the same magnitude as $P_4$.

(b) B-SCORE($S_B$)

Now consider the case when A is already in the A-group of a filter. When B is entered into the B-group, the total number of opaque cells is normally extended, causing the transmittance of characters in the A-group to be reduced. The B-score is made up of two component scores, $S_{B1}$ and $S_{B2}$.

$$S_{B1}=\frac{-P_6T}{N_A}\sum\left[\frac{d_i}{x_i-d_i-T}\right]$$

where $d_i$ is the decrement in transmittance (due to the addition of the B-character) of the $i$-th character of the A-group, $x_i$ is the transmittance of the $i$-th A-character (before the B-character has been entered), T is the transmission threshold, $N_A$ is the number of characters in the A group, and $P_6$ is a positive parameter less than one. The summation is taken over the characters in the A-group. If $$x_i-d_i-T\leq 0$$

for any character in the A-group, then $S_{B1}$ is set equal to $-\infty$. As in the case of the A-score, it is advantageous not to exhaust too many of the unassigned cells. Thus, $S_B2$ is given by:

$$S_B2=-P_7z$$

where $z$ is the number of cells at the intersection of the B-area and the U-area and $P_7$ is a positive parameter less than one.

(c) AB-SCORE

If neither A nor B is present in the filter, the score is the sum of the A-score with B entered into the filter, and of the B-score with A entered into the filter. If A is present in the filter, the score is taken to be the sum of the A-score with B entered into the filter and of the B-score.

When B is present in the filter, the B-score is zero since all the $d_i=0$, and the A-score is the total AB-score.

(d) BONUS FOR NEW PAIRS ($S_N$)

Other things being equal a bonus score, $S_N$, is given which is proportional to the number of new pairs $N_P$ created. Thus $S_N$ is expressed by:

$$S_N=P_8N_P$$

where $P_8$ is a positive parameter less than one.

Figure 5:
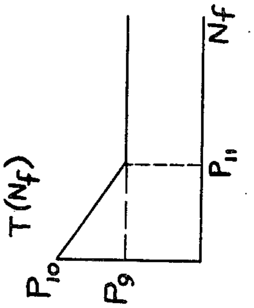
FIG. 5 is a diagram illustrating other features of the design of the filters of FIG. 3.

(e) TOLERANCE LEVEL—SEE FIG. 5

The tolerance level T is a function of the number of filters $N_f$ whose design has been started. As the numbers of filters is increased, the tolerance T is reduced linearly as shown by FIGURE 5, where:

$P_9$, $P_{10}$, and $P_{11}$ are positive parameter.

(f) NEW FILTER CRITERION

A parameter $P_{12}$ determines the minimum score required for a pair to be eligible for entry into an existing filter.

(g) PARAMETER VALUES

The following parameter values have been used as a first approximation:

| | |
|---|---|
| $P_1=10$ | $P_7=0.1$ |
| $P_2=2$ | $P_8=0.1$ |
| $P_3=0.1$ | $P_9=5.$ |
| $P_4=0.01$ | $P_{10}=15$ |
| $P_5=0.01$ | $P_{11}=10$ |
| $P_6=0.1$ | $P_{12}=0$ |

EXAMPLE II

Another method of selecting filters in accordance with the present invention is as follows: The characters are arranged in decreasing order of area. The first character is thought of as being recorded on the initially blank filter in terms of transparent squares. The second and possibly additional characters are actually recorded on the filter in terms of opaque squares. The first character may be termed an A character. The second and additional characters may be termed B characters. The response of the filter to the A character may be termed $t_A$. The response of the filter to the B characters must be 0. However, the B characters can be entered only as long as the response of the filter to the A character is greater than a tolerance level T that is dictated by the optical and electrical detecting equipment. If a B character cannot be entered, a new filter is started. Thereafter, a B character is entered into that filter which would realize a maximum score S with respect to all filters and in accordance with the equation:

$$S=\text{Min }(t_A-T)$$

where Min $(t_A-T)$ refers to the minimum value of $t_A-T$ with respect to the A-character responses in a given filter.

After going through the list, the procedure is repeated by recording the second character as an A-character and the third and possibly additional characters as B characters with assignment $t$. These filters as dictated by the equation above. New filters are created when necessary. The process is continued until all characters but the last in the decreasing order of area have been recorder as A-characters.

In operation, after the filters have been suitably designed and placed in holders 56 of array 16, successive unknown characters 13 may be located by positioning component 12 for illumination by source 10. Distinct images of the unknown character are cast on various filters 58 by various lenses 62. The resulting light flux from various filters 58 is directed to various detectors 74 of array 22 by various lenses 72 of array 24. By virtue of the responses of detectors 74, flip flops 76 are actuated to their "1" or "0" states. In consequence the identity of character 13 is determined by indicator 88. The present invention thus provides a technique by which an unknown character may be identified by registering it with a plurality of filters that operate together rather than independently.

Since certain changes may be made in the above disclosed device without departing from the scope of the invention disclosed herein, it is intended that all matter shown in the accompanying drawings and described in the foregoing specification be interpreted in an illustrative and not in a limiting sense.

What is claimed is:

1. A character recognition system comprising positioning means for locating an unknown character, a plurality of lens means defining a plurality of optical paths each including said unknown character, a plurality of filter means disposed in said optical paths for receiving radiation through said lens means from said unknown character, a plurality of photodetector means disposed in said optical paths for receiving radiation from said plurality of filter means, and logical means for receiving a plurality of signals from said photodetector means, said plurality of signals cooperating to indicate a representation of said unknown character, each detector means of said plurality being characterized by a threshold of the light flux from each of said optical paths, each said detector having first output means for said light flux being greater than said threshold and second output means for said light flux being less than said threshold, a plurality of flip-flop means said logical means including AND-matrix means, said first output means and said second output means determining the state of said flip-flop means, said plurality of flip-flop means controlling said AND-matrix means.

2. A character recognition system comprising positioning means for locating an unknown character, a plurality of lens means defining a plurality of optical paths each including said unknown character, a plurality of filter means disposed in said optical paths for receiving radiation through said lens means from said unknown character, a plurality of photodetector means disposed in said optical paths for receiving radiation from said plurality of filter means, logical means for receiving a plurality of signals from said photodetector means, said logical means including a plurality of flip-flop means and an AND-matrix means, said detector means determining the state of said flip-flop means, said plurality of flip-flop means controlling said AND-matrix means.

3. The character recognition system of claim 2 wherein each said filter constitutes a grid of opaque and transparent areas.

4. The character recognition system of claim 2 wherein said unknown character is one of $n$ unknown characters and the number of filters is less than $n$ and greater than $log^2 n$.

5. A character recognition system comprising positioning means for locating an unknown character, a plurality of lens means defining a plurality of optical paths each including said unknown character, a plurality of filter means disposed in said optical paths for receiving radiation through said lens means from said unknown character, a plurality of photodetector means disposed in said optical paths for receiving radiation from said plurality of filter means, logical means for receiving a plurality of signals from said photodetector means, said plurality of signals cooperating to indicate a representation of said unknown character, said filter means and said character means being at conjugate foci of said lens means, each detector means of said plurality being characterized by a threshold of the light flux from each of said optical paths, each said detector producing a first output when said light flux is greater than said threshold and a second output when said light flux is less than said threshold, a plurality of flip-flop means and an AND-matrix means, said first output and said second output determining the state of said flip-flop means, said plurality of flip-flop means controlling said AND-matrix means, said AND-matrix means constituting said logical means.

6. The character recognition system of claim 5 wherein each said filter constitutes a grid of opaque and light areas.

References Cited by the Examiner

UNITED STATES PATENTS

| | | | |
|---|---|---|---|
| 2,919,425 | 12/59 | Ress et al. | 340—149.1 |
| 3,056,033 | 9/62 | Shephard | 340—146.3 |
| 3,112,468 | 11/63 | Kamentsky | 340—146.3 |

MALCOLM A. MORRISON, *Primary Examiner.*

NEIL C. READ, *Examiner.*